United States Patent [19]

Jenkins

[11] Patent Number: 5,056,315

[45] Date of Patent: Oct. 15, 1991

[54] COMPOUNDED TURBOCHARGED ROTARY INTERNAL COMBUSTION ENGINE FUELED WITH NATURAL GAS

[76] Inventor: Peter E. Jenkins, 421 Sycamore, Lincoln, Nebr. 68510

[21] Appl. No.: 423,257

[22] Filed: Oct. 17, 1989

[51] Int. Cl.⁵ .......................... F02C 5/00; F01N 3/10
[52] U.S. Cl. ........................................ 60/614; 60/303; 60/624
[58] Field of Search .................. 60/606, 614, 615, 624, 60/303, 618; 123/203, 215

[56] References Cited

U.S. PATENT DOCUMENTS

| | | |
|---|---|---|
| 1,847,506 | 3/1932 | White ........................... 60/303 X |
| 2,202,298 | 5/1940 | Park . |
| 2,674,521 | 4/1954 | Houdry . |
| 2,806,346 | 9/1957 | Clayton .......................... 60/303 X |
| 2,848,866 | 8/1958 | Geislinger . |
| 2,898,731 | 8/1959 | Barr . |
| 3,007,302 | 11/1961 | Vincent . |
| 3,058,298 | 10/1962 | Morris ........................... 60/303 X |
| 3,163,984 | 1/1965 | Dumont . |
| 3,590,579 | 7/1971 | Takahashi ........................ 60/303 X |
| 3,672,160 | 6/1972 | Kim . |
| 3,736,752 | 6/1973 | Melchoir . |
| 3,759,040 | 9/1973 | Peltomaki . |
| 3,918,263 | 11/1975 | Swingle ................................ 60/614 |
| 3,990,242 | 11/1976 | Müller . |
| 4,050,536 | 9/1977 | Pristash . |
| 4,091,620 | 5/1978 | Dorsch . |
| 4,449,370 | 5/1984 | Ream . |
| 4,474,007 | 10/1984 | Kronogard et al. .............. 60/624 X |
| 4,586,338 | 5/1986 | Barrett et al. .......................... 60/618 |
| 4,596,211 | 6/1986 | Szloboda ......................... 123/525 X |
| 4,674,283 | 6/1987 | Ishida et al. . |
| 4,742,683 | 5/1988 | Heminghous et al. . |
| 4,807,579 | 2/1989 | Rees . |

Primary Examiner—Michael Koczo
Attorney, Agent, or Firm—Knobbe, Martens, Olson & Bear

[57] ABSTRACT

A Wankel rotary engine is modified to operate on natural gas, with the exhaust from the engine being fed into a combustion chamber where an ignition device ignites the hydrocarbons in the engine exhaust, with the engine timing, and the air and fuel mixture of the engine being controlled to produce a sufficient amount of hydrocarbons in the engine exhaust to enable ignition and combustion of the engine exhaust in the combustion chamber without the addition of fuel to air. The exhaust from the combustion chamber drives a power turbine. In further embodiments, the engine may be turbocharged, and heat exchangers use the excess heat from the engine coolant, lubricant, and exhaust gases to heat a usable liquid, such as water, thus providing a cogeneration system.

16 Claims, 6 Drawing Sheets

COMPOUNDED TURBOCHARGED ROTARY INTERNAL COMBUSTION ENGINE FUELED WITH NATURAL GAS

FIELD OF THE INVENTION

The present invention relates to turbocompounded, rotary Wankel engines, and their use in cogeneration systems.

BACKGROUND OF THE INVENTION

There have been a number of previously known compound engines having two diverse engine types which are coupled together to provide a common output. Such an engine is described in U.S. Pat. No. 4,742,683 which couples a rotary Wankel engine with a turbine engine; U.S. Pat. No. 4,586,337 which couples a turbocharged reciprocating engine with a power turbine; U.S. Pat. Nos. 4,843,821, and 4,791,787 which couple a reciprocal engine with a rotary Wankel engine.

These compounded engines are two separate engines of different types used to generate power, and are to be distinguished from a turbocharged engine which has a small turbine with an impeller driven by the exhaust of an engine, and which drives a compressor to compress air to supercharge the engine. Various designs have been developed for alternate uses of the turbochargers, as illustrated by U.S. Pat. No. 4,449,370 which has a turbocharged diesel engine coupled with a turbocharger that may be independently driven by a catalytic combustor in order to generate electric power when the diesel is not running.

Compound engines enjoy many advantages in certain applications, and seek to take advantage of the optimum efficiencies of each particular engine type over the particular operating range most suitable for each particular engine type. For example, one of the diverse engine types is particularly efficient during certain operating conditions while, conversely, the other engine type enjoys certain efficiencies during different operating conditions. For this reason, in prior compounded systems one engine type complements the other engine type by providing a second, separately fueled engine, thus providing overall engine efficiencies over a wider range of operating conditions of the compound engine than is available from each engine independently.

For example, the engine described in U.S. Pat. No. 4,586,337 has a combustor in which fuel is injected and ignited in order to drive a turbine, with the exhaust from a compounded Wankel engine being fed into the combustor along with a variable amount of compressed air. The ratio of power output between the two engines may be varied, with one increasing while the other decreases, but operating over a broader range than available with either engine independently.

One difficulty with engines, which may become worse with compounded engines, is the generation of excess pollutants. If the exhaust of one engine is fed into the combustion chamber of another engine, the increased combustion temperature of the second engine in combination with the incoming fuel and oxygen may generate increased nitrogen oxide pollutants. If one of the compounded engines is operating inefficiently, then unburned hydrocarbon pollutants may be expelled in the exhaust. There is thus a need for a compounded system which reduces the amount of pollutants generated.

Many compound engines have been of the reciprocating piston type, and numerous devices have been devised which attempt to enhance the power produced from the exhaust. Disadvantageously, the turbocompounding of reciprocating internal combustion engines causes adverse back pressure into the piston combustion chamber, and a decreased pressure drop on any turbocharger used with the compounded engine. Both effects cause a reduction in power. There is thus a need for a turbocompounded engine which performs efficiently at higher backpressures.

No matter how efficient the engine, a large amount of waste energy is often expelled through the exhaust, or through the lubricants and coolants. Adiabatic turbocompounded diesel engines are being investigated which use expensive ceramic materials to allow higher temperature adiabatic combustion in order to increase the engine efficiency. Such engines, however, are expensive, and require exotic materials and parts which are neither widely nor commercially available.

Cogeneration systems have been developed to take advantage of the heat available in the exhaust, lubricants, or coolants of conventional internal combustion engines. Such systems typically use heat exchangers to recapture a portion of the heat from conventional internal combustion engines, with the engines being used to drive an electric generator. While such cogeneration systems use available components, they are bulky, heavy, of limited power, of limited generation capability, and sometimes present disadvantages in providing the liquid fuel in environments where a number of people are present.

There is thus a need for a compound engine which overcomes these disadvantages, but offers the advantages in weight and size as other turbocompounded engines, and has the added advantages of extreme fuel efficiency and reduction of exhaust pollutants. There is a further need for using such a compounded engine in a cogeneration application to derive the maximum energy possible from the system while generating the minimum pollutants.

SUMMARY OF THE INVENTION

The invention comprises a Wankel engine which is modified to operate with natural gas as a fuel. A combustion chamber is connected in fluid communication with the exhaust from the engine, with the chamber having an ignition device suitable for igniting the hydrocarbons in the engine exhaust, and with the engine timing, and the air and fuel mixture of the engine being controlled to produce a sufficient amount of hydrocarbons in the engine exhaust to enable ignition and combustion of the engine exhaust in the combustion chamber without the addition of fuel or air. A controllable ignition device is used to ignite the exhaust gases at predetermined times. The combustion of the exhaust reduces pollutants, and increases the energy which may be recovered from the exhaust.

A power turbine is connected in fluid communication with, and driven by, exhaust gases resulting from combustion of the engine's exhaust in the combustion chamber. The power turbine may be connected to a drive shaft of the engine, or may power a separate device.

In an alternate embodiment, a turbocharger may be connected to the engine to compress air for use by the engine, with the turbocharger being driven by the exhaust gases which exit from the engine. Advantageously, the turbocharger is located intermediate the engine and the combustion chamber.

In a further embodiment of the invention, a heat exchanger is connected in thermal communication with a heating liquid, the heat exchanger also being connected in thermal communication with at least one of the engine or the exhaust from the power turbine to heat the liquid. Advantageously, the heating liquid is water, so that the heat from the engine or the exhaust from the turbine can be used to heat the water in a cogeneration system. If the engine and/or power turbine drive an electrical generator, then an efficient cogeneration system is provided.

Advantageously, there are a plurality of heat exchangers in thermal communication with the common heating liquid, with the heat exchangers also being in thermal communication with one or more of a coolant system cooling the engine, a lubricant system lubricating the engine, or exhaust gases exiting the power turbine, in order to heat the heating liquid. Again, if the heating liquid is water, the heat from the engine or the exhaust from the turbine can be used to heat the water in a cogeneration system.

The subject invention also comprises a method of energy generation and use, in which a Wankel engine fuelled with natural gas is operated, with an engine drive shaft being used to transfer energy to a predetermined device. The exhaust from the engine is communicated to a combustion chamber, where the hydrocarbons in the engine exhaust are ignited at predetermined times, with the engine timing, and the air and fuel mixture of the engine being controlled to produce a sufficient amount of hydrocarbons in the engine exhaust to enable ignition and combustion of the engine exhaust in the combustion chamber without the addition of fuel or air. The exhaust from the combustion chamber is communicated to a power turbine, with the exhaust driving the turbine to generate usable energy.

A turbocharger may be placed in fluid communication with the exhaust gases from the engine to compress air for use by the engine, with the turbocharger being driven by the exhaust gases which exit from the engine. A heat exchanger may be connected in fluid communication with at least one of the engine or the power turbine, the heat exchanger being further placed in thermal communication with a heating liquid to heat the liquid. Advantageously, the heating liquid comprises water, and the method forms a cogeneration system for generating electrical power and hot water.

In a further embodiment of this method, a plurality of heat exchangers may be placed in thermal communication with a common heating liquid such as water, and with the heat exchangers further connected in thermal communication with one or more of a coolant system cooling the engine, a lubricant system lubricating the engine, or the exhaust gases exiting the power turbine in order to heat the heating liquid.

The current invention thus provides a natural gas turbocompounded naturally aspirated or turbocharged rotary engine with ignited and expanded exhaust gases, which is compact in weight and size and yet highly efficient in operation over a wide range of engine operating conditions. The secondary ignition of the exhaust gas in the combustion chamber without the addition of air or fuel further reduces pollutants, and enables the recovery of additional energy from the exhaust.

The combustion in the auxiliary chamber is timed to synchronize with the infusion of exhaust gases from the rotary engine. The gases are expanded into a turbine or expander connected by means of gearing to the drive shaft. The fuel combustion by the Wankel engine, the timing, and other manipulations to the engine operation provides compressed exhaust gases of sufficient fuel content and temperature to allow thorough combustion in the second combustor.

The combination of the combustion within the Wankel engine and the expansion of ignited exhaust gases into the turbine expander produce substantially more power than other turbocompounded engines. Moreover, the present invention permits a much more complete recovery of the energy from the internal combustion rotary engine exhaust, which energy may advantageously be directed to the rotary engine drive shaft by various means, such as a continuously variable transmission.

In a further embodiment of the invention, the turbocompounded engine as described is installed in a generator set ("genset") consisting of two such engines with drivingly connected drive shafts connected to one or more peripherals. The engine oil and engine coolant are flowed through a heat exchanger to produce heated liquid which can also be enhanced with an exhaust heat exchanger attached to the exhaust gases leaving the expander. Excess heat is eliminated by a bypass attached to a cooling tower or radiator. The genset system advantageously provides increased power at lower cost, and reduced size and weight. The use of two engines provides a back-up system at lower power levels, and increased efficiency over a broad power range by allowing the two engines to be operated simultaneously, or only one engine to operate at lower power levels to conserve energy.

In this alternate configuration, a second Wankel engine is modified to operate with natural gas as a fuel. A combustion chamber is placed in fluid communication with the exhaust from the second engine, with that chamber having an ignition device suitable for igniting hydrocarbons in the second engine's exhaust, with the second engine's timing, and the air and fuel mixture of the second engine being controlled to produce a sufficient amount of hydrocarbons in the second engine's exhaust to enable ignition and combustion of the second engine's exhaust in the associated combustion chamber without the addition of fuel or air. A controllable ignition device is in communication with the chamber to ignite the second engine's exhaust gases at predetermined times. A turbocharger compresses air for combustion by the second engine. A second power turbine is placed in fluid communication with, and driven by, exhaust gases resulting from combustion of the second engine's exhaust. The plurality of heat exchangers are placed in further thermal communication with, and use the heat from, at least one of a system cooling the second engine, a system lubricating the second engine, or exhaust gases exiting the second power turbine, to heat the heating fluid.

There is thus advantageously provided an apparatus, and a method, for providing cogeneration of power and a heated fluid. The two engine system allows for additional flexibility in handling variable load and energy demands, while reducing weight and cost by offering the ability to use several common elements.

BRIEF DESCRIPTION OF THE DRAWINGS

The invention may be more fully understood by reference to the drawings, in which like numbers refer to like parts throughout the drawings.

DETAILED DESCRIPTION OF A PREFERRED EMBODIMENT

Figure 1:
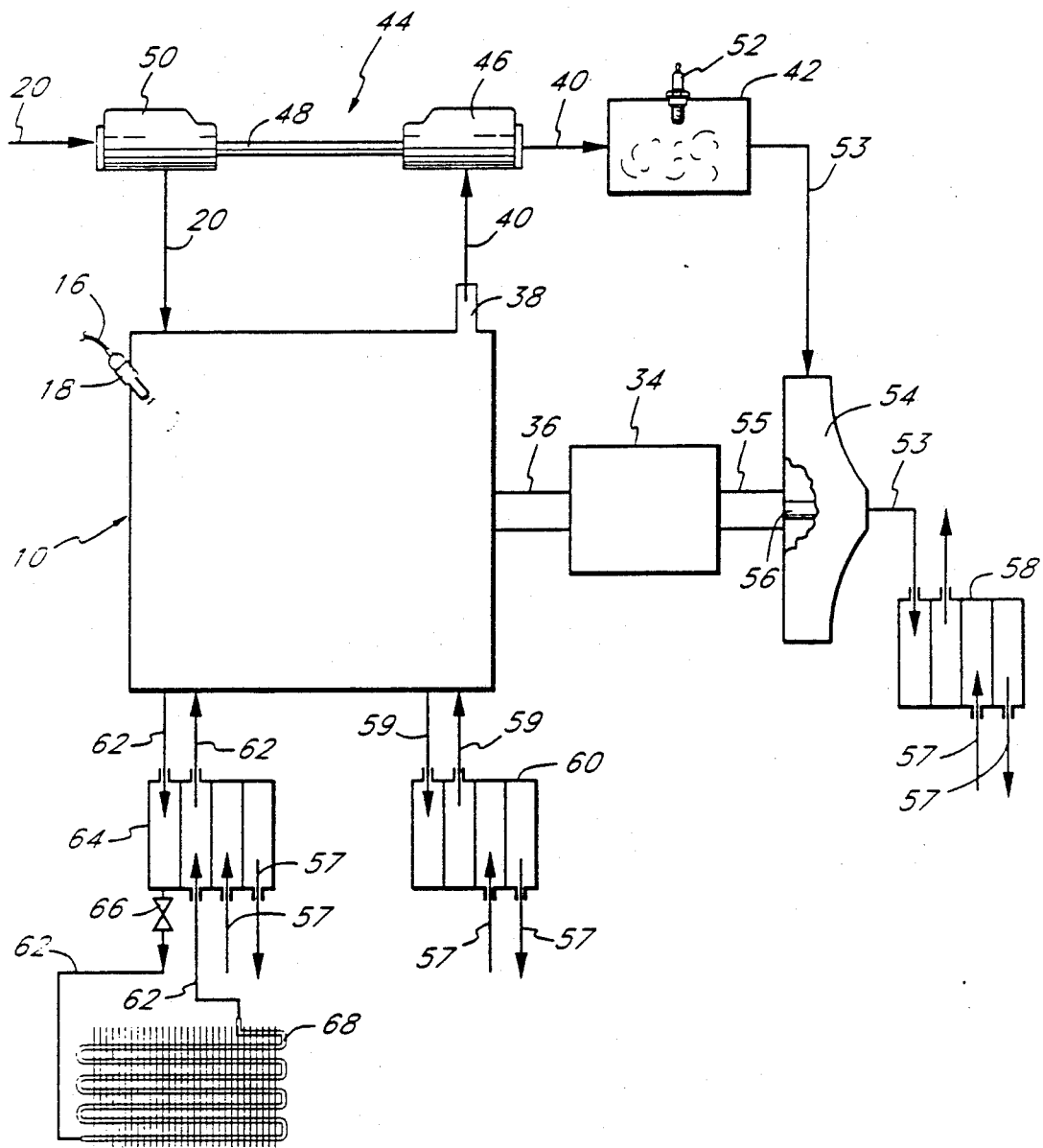
FIG. 1 is a flow chart showing an operation configuration of the invention.
Figure 2:
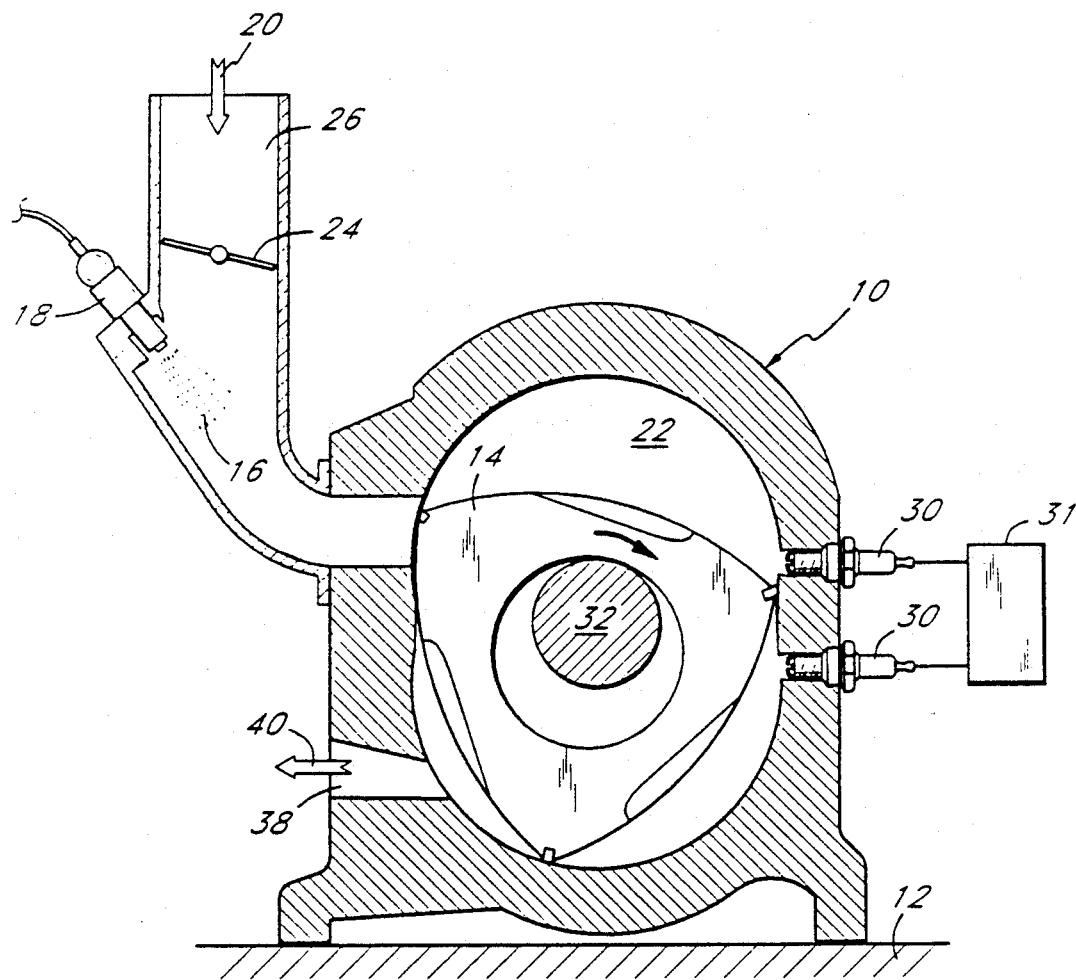
FIG. 2 is an exemplary cross-sectional view of a Wankel engine of this invention.

Referring to FIGS. 1 and 2, a Wankel engine 10 is mounted to a support 12 (FIG. 2). Such a Wankel engine, the model 13B, is made by Mazda, having two rotors 14 (FIG. 2). As the two rotors 14 are constructed the same, only one is shown. The Wankel engine 10 is modified to operate with natural gas 16 as a fuel, rather than gasoline, as indicated in a December, 1988 *Design News* article.

The natural gas 16 is fed into a natural gas fuel injection system 18 mounted on the engine 10. The fuel injection system 18 injects the natural gas 16 into the incoming air stream 20, with the fuel and air mixture being injected into an engine combustion chamber 22 (FIG. 2) of the Wankel engine 10. Air control means, such as butterfly valve 24 (FIG. 2) controls the variable amount of air entering the engine 10. The fuel injection system 18 controls the variable amount of fuel injected into the passing air stream 20.

The natural gas 16 is fed into the combustion chamber 22 at a flow rate and timing which may be varied during operation of the engine 10 by means known in the art. A feed rate of about 17 cubic feet per minute (cfm) is believed suitable for a naturally aspirated engine 10. If the engine 10 is turbocharged, then a feed rate of about 21 cfm is believed suitable. The timing and flow rate of the natural gas 16 and the air stream 20 may be altered to vary the amount of unburned hydrocarbons in the exhaust gas exiting the engine 10 by the above described means. As such control means to vary the timing and flow rates are known in the art, they are not described in greater detail.

Combustion is achieved in the rotary combustion chamber 22 of the Wankel engine 10 by ignition of spark plugs 30 in a stratified charge system resulting in the rotation of rotor 14 to an exhaust position. Advantageously, combustion is obtained at about 30 degrees before maximum compression, or before top dead center (BTDC), at which point the fuel 16 is ignited by the spark plugs 30.

An electronic ignition device 31, known in the art and not described in detail herein, is used to control the timing of the spark plug ignition. Advantageously, two spark plugs 30 are used for each rotor 14, with a slight differential in the firing of each of the plugs 30 being used to control the combustion in the stratified charged chamber 22. A delay of a few thousandths of a second between the firing of the two plugs 30 is believed sufficient, but will vary depending on engine speed and other timing considerations.

The rotors 14 connect to and rotate a drive shaft 32. The drive shaft 32 may be used to power diverse devices, but advantageously is drivingly connected to an electric generator 34. As needed, a speed changer 36 (FIG. 1) may be placed intermediate the engine 10 and generator 34 so that the speed of shaft 32 is compatible with the speed of the generator 34, or vice versa.

The rotary engine drive shaft may also be connected to a variety of rotary output appliances such as a generator, a drive shaft for a vehicle, a compressor, a centrifugal chiller, or other apparatus requiring mechanical power in the form of a rotating drive shaft.

When the rotors 14 rotate so as to have the combustion gases communicate with exhaust ports 38 (FIG. 1), the engine exhaust 40 exits the combustion chambers 22 of the Wankel engine 10 and is fed into a combustor 42 (FIG. 1) by means known in the art and not described in detail herein. If the engine combustion chamber 22 is viewed as comprising a first combustion chamber, then the combustor 42 comprises a second combustion chamber.

Referring to FIG. 1, advantageously, the exhaust gases from the Wankel engine 10 may be passed through a turbocharger 44 prior to entering the second combustion chamber 42. The turbocharger 44 comprises an impeller 46 located in the path of the exhaust gases 40, with a shaft 48 communicating with a compressor 50. The compressor 50 is in fluid communication with the combustion chamber 22 of the Wankel engine 10.

The exhaust gases 40 are ignited at predetermined times in the combustor 42 by an ignition device 52, such as a spark plug, and further combusted to form exhaust gases 53. Preferably, no air or fuel is added to the exhaust gases 40 before combustion in the combustor 42 to form exhaust gases 53. As the gases 40 are burned in the second combustion chamber 42, the temperature and pressure increase.

Figure 4:
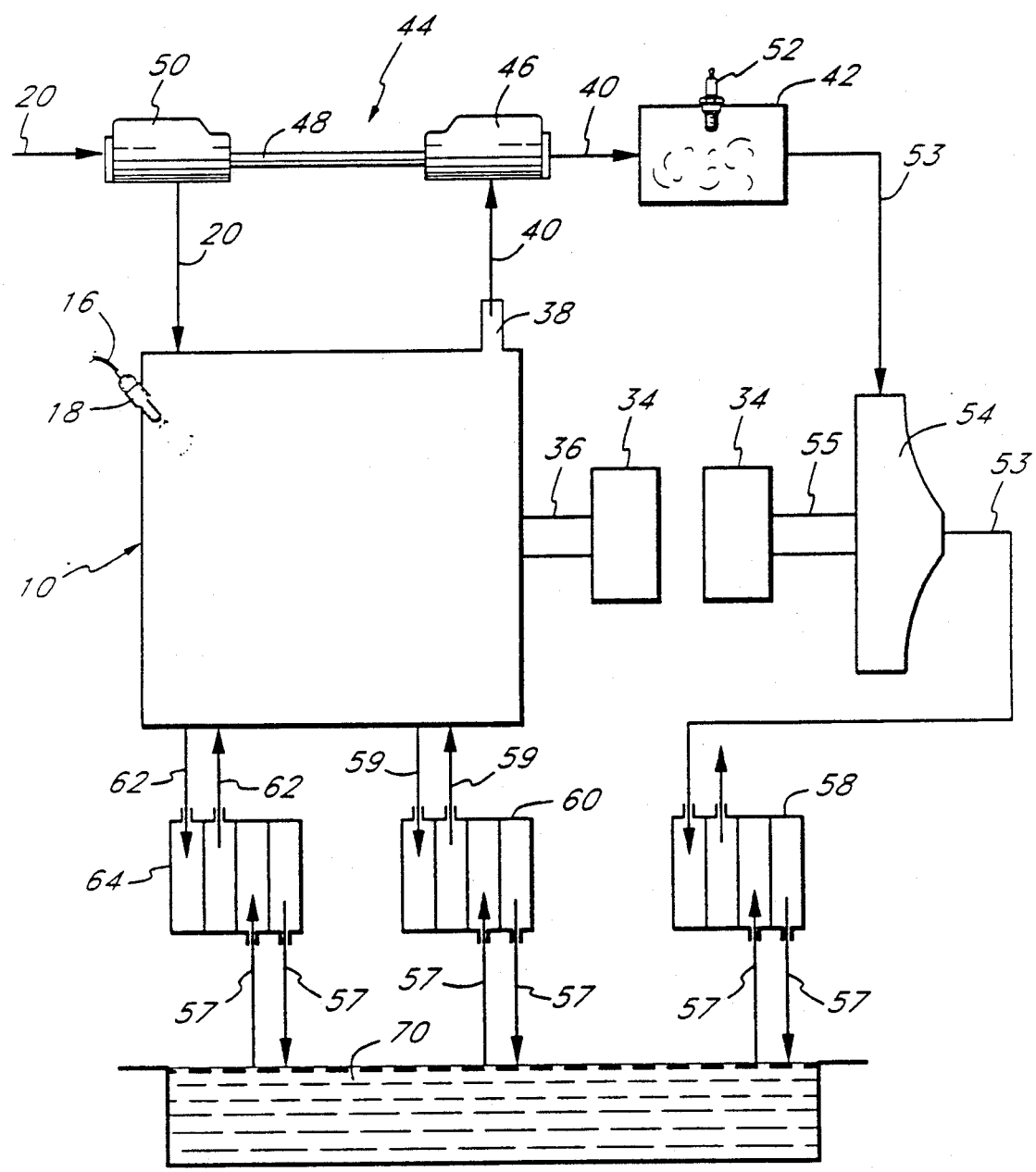
FIG. 4 is a flow chart showing an operation configuration of an alternate embodiment of this invention with a plurality of heat exchangers connected in parallel to a reservoir.

The ignited, heated exhaust gases 53 from the second combustion chamber 42 are in fluid communication with, and expanded into, a turbine expander 54 causing rotation of turbine shaft 56. The turbine shaft 56 is advantageously in power communication with the rotary engine drive shaft 32 by means known in the art such as a gear train, which power communication means may advantageously take the form of a continuous variable transmission (CVT) 55 which mechanically or hydrostatically connects the turbine shaft 56 and the output shaft 32 of the Wankel engine 10 so that they can rotate in synchronism with each other. In the illustrated embodiment of FIG. 1, the turbine 54 and the engine 10 are both shown as being operatively connected with the same generator 34, while in the alternate embodiment of FIG. 4, the turbine 54 and the engine 10 are operatively connected with different generators 34, and in FIG. 5, the engine 10 and the turbine 54 are shown as being operatively connected to unspecified devices 51. In the embodiment of FIG. 4, the turbocharged engine 10 of this invention is believed capable of generating about 87 KW of power from the generator 34, while the turbine 54 is believed able to generate 177 KW of power from the generator 34. Thus, about twice as much energy is recovered from the exhaust as from the engine 10.

The exhaust gases 53 from the second combustion chamber 42 are believed to enter the turbine 54 at about 1900 degrees fahrenheit, and at a pressure of about four (4) atmospheres. In the envisioned embodiment, the exhaust gases 53 are expanded down to an exhaust temperature of about 300 degrees fahrenheit, and an exhaust pressure of about one (1) atmosphere, to produce torque to rotate the turbine shaft 56.

Advantageously, the exhaust gases from the turbine 54 are exhausted to a turbine exhaust heat exchanger 58 so that further heat may be extracted from the exhaust. Thereafter, the exhaust is emitted into the atmosphere. The construction of heat exchanger 58 is known in the art and not described in detail herein. Advantageously, the heat exchanger 58 may comprise a gas-liquid heat exchanger which heats a liquid 57 such as water.

A lubricant 59, such as oil, is used in the Wankel engine 10 for lubrication of the moving components, and is circulated through a lubricant heat exchanger 60. Preferably the heat exchanger 60 is a liquid-liquid heat exchanger used to heat a liquid 57, such as water. It is believed that the engine lubricant 59 may leave the engine 10 and enter the heat exchanger 60 at about 230 degrees fahrenheit, and return to the engine 10 at about 175 degrees fahrenheit. The energy recovered from the lubricant system of a single engine 10 is believed to be about 85,000 BTU per hour, or about 25 KW.

An engine coolant 62 is used to cool the Wankel engine 10 and is circulated through an engine coolant heat exchanger 64. The heat exchanger 64 advantageously takes the form of a liquid-liquid heat exchanger used to heat a liquid 57 such as water. The engine coolant 62 is believed to leave the Wankel engine 10 at about 195 degrees Fahrenheit, and to exit the heat exchanger 64 at about 187 degrees fahrenheit. The energy recovered from the coolant system of a single engine 10 is believed to be about 211,000 BTU per hour, or about 62 KW.

The engine coolant 62 is directed by a heat sensitive valve 66 to a cooling tower such as radiator 68 to extract any excess heat from the coolant 62 in order to assure that the engine coolant 62 returns to the Wankel engine 10 at a suitably cool temperature, such as 90 degrees fahrenheit.

Figure 5:
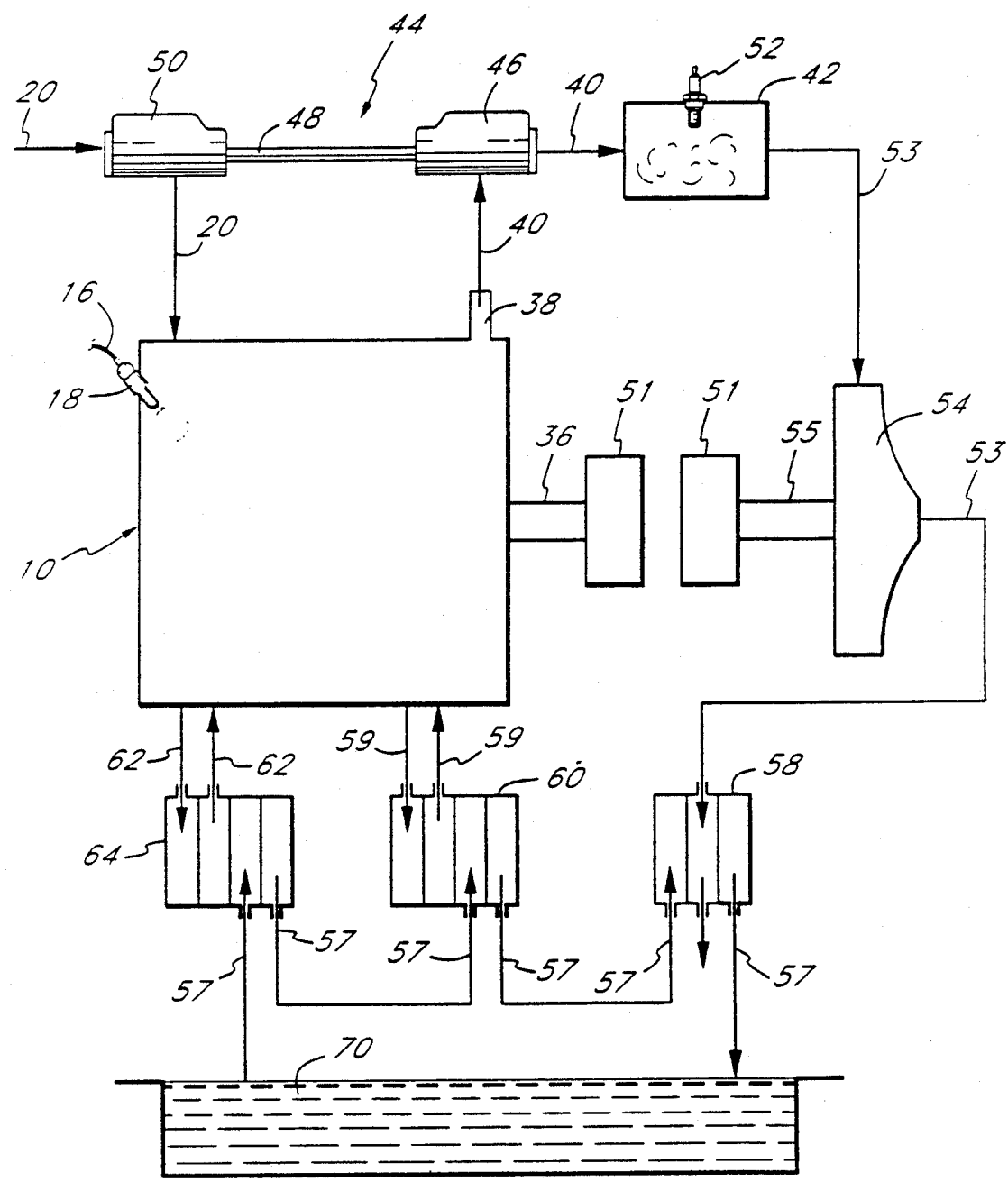
FIG. 5 is a flow chart showing an operation configuration of an alternate embodiment of this invention with a plurality of interconnected heat exchangers.

Advantageously, as shown in FIG. 1, one or more, and preferably all, of the heat exchangers 58, 60 and 64 are in fluid communication with each other and with a common reservoir of liquid 70 (FIG. 5) so that a common liquid 57 may be circulated through the heat exchangers to absorb heat. Advantageously, this common liquid 57 may be water so as to provide a source of hot water for personal or industrial use. Such an arrangement is shown in FIG. 4, in which the heat exchangers 58, 60 and 64 are connected in parallel with the reservoir 70, with the arrangement of FIG. 5 showing the heat exchangers 58, 60 and 64 connected in series with each other and with the reservoir 70.

Figure 3:
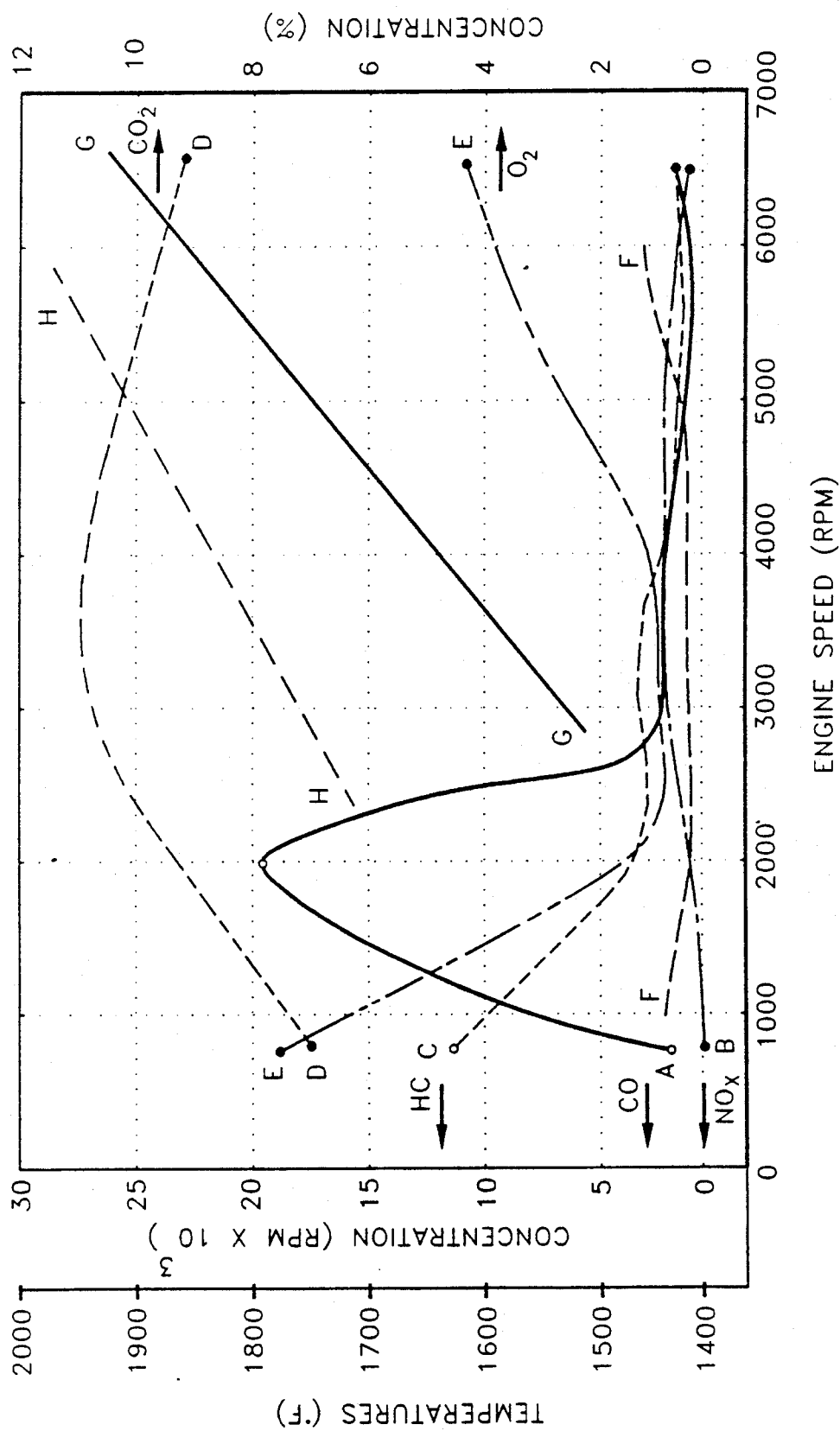
FIG. 3 is a graph of actual and anticipated exhaust temperatures and exhaust composition at various speeds of operation of a Wankel engine.

Referring to FIG. 3, the anticipated temperatures and composition of the exhaust gases 40, 53, are reflected at various operating speeds for a 13B, two rotor, four port induction Wankel engine, fueled with natural gas, with no turbocharger, and with the engine tuned to run at maximum efficiently at 4000 RPM at wide open throttle. Curve A graphs the effect of engine speed in revolutions per minute (RPM) versus the concentration of carbon monoxide (CO) in parts per thousand, i.e., parts per million (PPM) times one thousand. Curve B graphs the effect of engine speed in RPM versus the concentration of nitrogen oxides ($NO_x$) in parts per thousand. Curve C graphs the effect of engine speed in RPM versus the concentration of unburned hydrocarbons (HC) in parts per thousand.

Curve D graphs the effect of engine speed in RPM versus the percentage concentration of Carbon Dioxide ($CO_2$) of the entire exhaust gases. For example, at about 5400 RPM, the $CO_2$ concentration comprises about 10% of the total exhaust. Curve E graphs the effect of engine speed in RPM versus the total concentration of oxygen ($O_2$). Curves A through E are based on experimental data.

Curve F graphs the predicted effect of engine speed in RPM versus the total concentration of all combined emissions exiting the combustor 42, and thus represents the predicted concentration of pollutants in the exhaust 53 exiting the second combustion chamber 42. Curve F is not based on experimental data, but rather reflects projected values extrapolated from experimental data and analytical estimates.

Overlaid with the graphs of curves A through F, are two graphs reflecting the variation of exhaust temperature versus engine temperature. Thus, curve G graphs the effect of engine speed in RPM versus the temperature in degrees fahrenheit on the exhaust 40 exiting the engine 10. This curve is based on experimental data. Curve H graphs the effect of engine speed in RPM versus the temperature in degrees fahrenheit on the exhaust 53 exiting the second combustor 42. Curve H is based on predicted values for combustion of the residual unburned hydrocarbons in the exhaust gas 40.

As illustrated by FIG. 3, using natural gas as the fuel for the Wankel engine 10, the exhaust gases exiting the Wankel engine 10 consist primarily of carbon monoxide (CO), carbon dioxide ($CO_2$), nitrogen oxides ($NO_x$), and unburned hydrocarbons (HC). The temperature of these gases is believed to be about 1640 degrees fahrenheit at 4000 RPM, which is substantially higher than the 1000 to 1100 degree fahrenheit temperature of the typical exhaust from normal gasoline or diesel piston engines. Depending on the adjustment of the timing and natural gas fuel injection system 18, the exhaust gases may also contain unburned natural gas, and a variable amount of hydrocarbons (HC), also at about the same temperature, but depending on the RPM change caused by the altered performance of the engine 10.

Combustion of the exhaust gases 40 in the second combustor 42 is believed to raise the temperature of the exhaust gases 53 to approximately 1900 degrees fahrenheit, at 4000 RPM. The temperature of the gases 53 leaving the combustor 42 are about the same as the temperature of the gases entering the turbine expander 54. As indicated by a comparison of curves G and H, the second combustion is believed to increase the temperature of the exhaust gases 53 an average of about 260 degrees, with the temperature increase providing more potential energy to recover from the exhaust gases 53 via the power turbine 54.

The combustion in the second combustor 42 is also believed to change the constituency of the exhaust gas to primarily $CO_2$ and $H_2O$, eliminating about half of the $NO_x$, and CO, and a significant portion of the $CO_2$, at an engine speed of about 4000 RPM, as shown by a comparison of curves A through E, with curve F. The composition of the exhaust gases from the combustor 42 is essentially similar to the makeup of the gases exhausted from the turbine 54 into the atmosphere. Thus, there is advantageously provided a means for reducing the pollutants in the exhaust.

Curves G and H of FIG. 3 reflect the temperature variance from the exhaust gases 40 entering the combustor 42, relative to temperature of the exhaust gases 53 exiting the second combustor 42 and entering the turbine expander 54, for the natural gas fuel 16. The greater the temperature of the gas, the greater the energy that may be recovered through various devices such as the turbine 54 and the heat exchangers 58, 60 and 64. The use of natural gas as the fuel 16 thus provides not only additional power to the engine 10, but advantageously offers greater potential for recovering a greater amount of energy from the combusted gas through the turbine 54, and through the cogeneration systems of the heat exchangers 40, 60 and 64. The second combustor 42 further increases the potential energy to be recovered while simultaneously reducing pollutants. There is thus advantageously provided a means for deriving more useful energy from the exhaust, and for doing so while reducing pollutants.

The rotary engine 10 and the turbine expander 54 are interconnected, and the expander only operates to the extent that exhaust gases are available from the engine 10. Therefore, there is no separate throttling for the expander independent of the engine 10, and control of the speed of the engine 10 may be achieved by throttling the engine 10 in the normal fashion.

By controlling the ignition timing of the engine 10, the amount of unburned hydrocarbons and fuel 16 present in the exhaust gases may be controllably varied. The amount of hydrocarbons in the exhaust 40 is controlled so that combustion in the secondary chamber 42 may occur without the addition of air or fuel.

As the timing is changed to provide less complete combustion, there is a corresponding decrease in the power output by the engine 10 through the drive shaft 32. As the combustion in the engine 10 is less complete, the temperature of the coolant 62 and the lubricant 44 is also less, thus reducing the heat that may be recovered by the heat exchangers 60 and 64. However, the less complete the combustion in the engine 10 causes an increase in the power available for the turbine 54 via more combustion in combustor 42, and more heat recoverable from the turbine exhaust through the turbine exhaust heat exchanger 58.

Conversely, if the timing of the engine 10 is varied to operate the engine 10 more efficiently, then the heat recoverable from the lubricant and coolant heat exchangers 58 and 64 increases, while the output of the turbine 54 and turbine exhaust heat exchanger decreases as there is less energy in the exhaust from the engine 10 to be recovered by the turbine 54 and the turbine exhaust heat exchanger 58.

The air and fuel ratios may also be advantageously adjusted to control the amount of hydrocarbons in the exhaust 40. Generally, as the air:fuel mixture runs lean, so there is an excess of oxygen for the amount of fuel, then the amount of hydrocarbons in the exhaust 40 decreases as there is more complete combustion. This causes a greater amount of power from the engine 10, and a decrease in the engine temperature, and a decrease in the temperature of the gases at the second combustor 42. On the other hand, the oxygen rich combustion generates more $NO_x$ pollutants in the exhaust 40 of the engine 10. If the air:fuel mixture runs rich, so there is an excess of fuel for the amount of oxygen, then more hydrocarbons and CO are produced in the exhaust 40, but less $NO_x$, and the temperature of the engine 10 increases, the power produced by the engine 10 decreases, and the temperature of the gases in the combustor 42 increases. As the amount of hydrocarbons in the exhaust 40 increases, the available energy from the second combustor 42 increases.

There is thus provided means for varying the power generated by the engine 10, and the downstream components such as the turbine 54, and the various heat exchangers 58, 60 and 64. By this means, the amount of power to the drive shaft 32 may be varied relative to the amount of heat recovered by the heat exchangers 58, 60 and 64. If the shaft 32 is used to generate electricity, and the heat exchangers 58, 60 and 64 are used to generate hot water, then the amount of electrical power generated may be varied relative to the amount of hot water generated.

There is thus advantageously provided an engine which produces few pollutants, but which has a high overall efficiency of operation. The further addition of the hot water cogeneration systems of the heat exchangers 58, 60 and 64 further extract the usable energy from the engine. Using natural gas as the fuel increases the overall energy output of the system components. When the engine 10 and turbine 54 are used to generate electrical power, and the heat exchangers 58, 60 and 64 are used to generate hot water, an efficient energy cogeneration system is provided which is believed to be of smaller size, lighter weight, and yet provides more power and hot water than previous cogeneration systems of comparable size. Moreover, the rotary nature of the Wankel engine lends itself to a longer life than available with reciprocating engines, thus providing further advantages on longevity and reduced maintenance.

Applicant's invention advantageously allows the use of an internal combustion Wankel engine as a gas compressor and generator to allow the combustion and expansion of the resultant exhaust to provide additional power to a drive shaft, and does so without the infusion of additional fuel during the second combustion. Thus, prior patents to Heminghous (4,742,683), Gadfelt (3,775,941), Bratton (2,807,930), and others which reflect a secondary combustion, are distinguishable as they provide additional fuel to the exhaust being combusted a second time, and require additional associated mechanisms and complexity not present in the subject invention.

The current invention is made possible by the temperature and composition of the exhaust 40 from the rotary Wankel engine 10, which exhaust 40 is unique to the Wankel type engine. The invention utilizes the higher temperature of exhaust gases from the rotary engine for expansion. By manipulation of the operating conditions of the rotary Wankel engine 10, the exhaust temperatures are varied to provide more or less expansion capability as the application requires. By virtue of such manipulation, the combustability of the exhaust can be further varied to provide expansion capabilities beyond that which has been achieved with piston engines.

Because of the nature of the Wankel type engine, the back-pressure which adversely affects the ability to turbocompound piston engines is not an adverse factor in the present invention. Turbocompounding, and even turbocharging, cause an increased backpressure on the exhaust from the engine's combustion chamber. This increased back pressure degrades the performance of piston engines. Wankel rotary engines, however, can operate at higher backpressures than piston engines partially because of the flywheel effect of the rotary engine. The backpressure capability of the piston and Wankel engines are similarly different, with the exhaust pressure of the engine 10 believed to be at about 8:1 atmospheres, and at about 4 or 5:1 atmospheres after the exhaust 40 exits the turbocharger 44. Thus, the increased backpressure capability of a Wankel engine is used to increase the overall performance over a turbocompounded and/or turbocharged piston engine.

The ability to operate at elevated backpressures also increases the potential energy available from a turbocompounded power turbine, since the greater the pressure differential across a turbine, the greater the energy which may be recovered by the turbine.

The second combustor 42 improves upon the advantages discussed above by increasing the temperature of the exhaust gases and enabling more energy to be extracted from the exhaust. The second combustion has the further advantage of reducing the pollutants in the exhaust as indicated in FIG. 3. In the illustrated embodiment, this second combustion occurs without adding any air or fuel, and thus occurs in an oxygen poor environment. The oxygen from the other pollutants is thus used in part to burn the unburned hydrocarbons in the second combustion chamber 42.

If additional air or fuel were injected into the second combustion chamber 42, then the combustion would occur in a fuel rich, or oxygen rich environment, and would not obtain the full advantages of reduction in pollutants as are believed achievable with the illustrated embodiment.

The second combustor 42 also increases the back pressure, making its use with piston engines undesirable or limited in use. The backpressure is believed to slightly increase during this second combustion, with the pressure of the exhaust 53 exiting the combustor 42 being about 4:1 atmospheres. As discussed above, however, the Wankel rotary engine can operate effectively at higher backpressures than piston engines, and thus the increased back pressure can be accommodated. The simplicity of the design of the second combustion eliminates the need for the added complexities of backpressure reduction mechanisms, or additional fuel and air injection mechanisms for the second combustion chamber.

The recovery of the additional energy available in the exhaust gases, lubricant, and coolant, by heat exchangers 58, 60 and 64, offer a further advantage for an improved cogeneration system producing more power and more hot water, for less fuel, and from a smaller and lighter construction than previously available.

Figure 6:
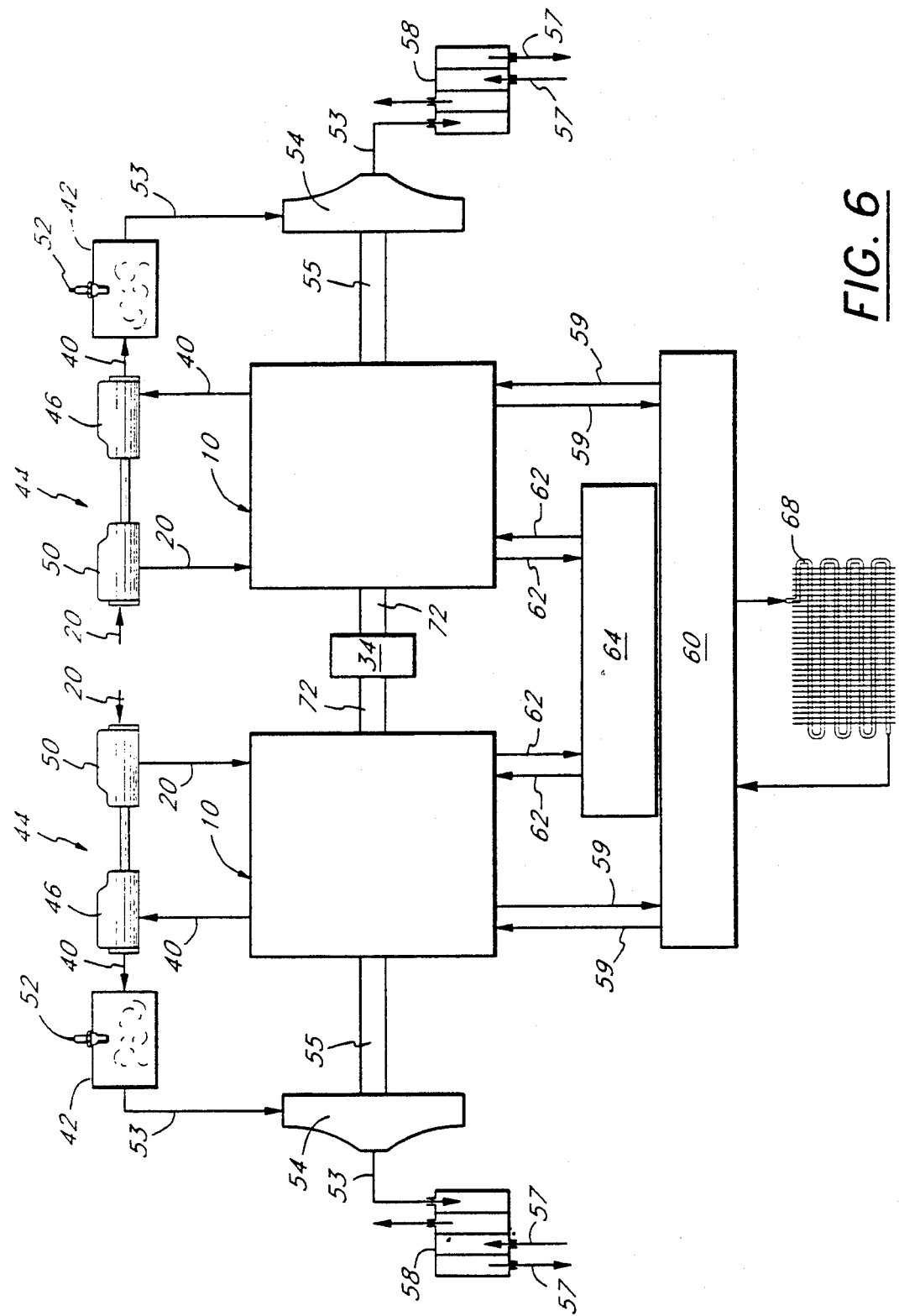
FIG. 6 is a flow chart showing an operation configuration of an alternate embodiment of the invention involving two Wankel engines in a cogeneration system.

Shown in FIG. 6 is a further embodiment of this invention comprising a genset of two natural gas fueled, turbocharged, turbocompounded, Wankel engines operating in cooperative configuration to generate electricity and hot water. Two natural gas fueled engines 10 are drivingly connected to a common generator 34. A clutch mechanism 72 is interposed between each of the engines 10 and the generator 34 to allow each engine 10 to be separately engaged or disengaged with the generator 34. Turbochargers 44 are driven by the exhaust 40 from each of the engines 10 to compress the air 20. The exhaust 40 from each engine 10 is fed into, and burned in, the second combustion chamber 42 which is in fluid communication with each of the engines 10. The exhaust 53 from each of the combustors 42 is fed to the two expanders 54. Each of the expanders are drivingly connected to the drive shafts of the adjacent engines 10 via the CVT's 55. Thus the expanders 54 drive the generator 34 when the appropriate clutch 72 is engaged.

The exhaust from each of the expanders or turbines 54 passes through a separate heat exchanger 58. The coolant 62 from each of the engines 10 is in thermal communication with a common heat exchanger 64. The lubricant 57 from each of the engines 10 is in thermal communication with a common heat exchanger 60. A cooling tower 68 is in thermal communication with the heat exchanger 64 to provide a means of disposing of any excess heat. The heat exchangers 58, 60, and 64 may alternatively be in thermal communication via the parallel arrangement shown in FIG. 4, or in thermal communication via the series arrangement shown in FIG. 5.

Advantageously, the energy from the heat exchangers 58, 60, and 64 may be used to heat potable water, providing a source of hot water suitable for human use. There is thus provided a source of cogenerating electricity and hot water. By separately controlling the engines 10, a variable amount of electrical power may generated by generator 34, with each of the engines 10 being operated as needed to generate the needed amount of power. The separate operation of the engines 10 not only provides for redundancy, but also allows the engines 10 to be simultaneously operated at various load combinations, although this may require the insertion of a CVT 55 in conjunction with, or in place of the clutches 72 in order to accommodate a different rotational speed between each of the engines 10 when they engage a common generator 34.

The use of common heat exchangers, and common generators, provides a weight savings as well as a cost savings in the reduction of components. Overall, the genset of FIG. 6 is believed to provide an increased power capacity, an increased flexibility in the amount of power generation, a savings in cost, weight, and size, and an anticipated reduction in pollutants.

While the above advantages have been described with respect to the illustrated embodiments, the invention is not restricted to the described and illustrated embodiments, but may be modified within the scope of the following claims.

I claim:

1. A compounded engine, comprising:
   a first Wankel engine having a housing with a trochoidal inner surface containing a generally triangular shaped rotor, the engine containing a fuel supply system suitable for operating the engine with natural gas as a fuel;
   a turbocharger compressing air for combustion by the engine, the turbocharger being driven by the exhaust gases which exit from the engine;
   a combustion chamber in fluid communication with the exhaust from the engine after that exhaust has passed through the turbocharger, the chamber having an ignition device suitable for igniting hydrocarbons in the engine exhaust, whereby the engine timing, and the air and fuel mixture of the engine are controlled so that when the engine exhaust reaches the combustion chamber the exhaust contains a sufficient amount of oxygen and hydrocarbons to enable ignition and combustion of that engine exhaust in the combustion chamber without the addition of fuel or air, and whereby the engine operating conditions are controlled to vary the performance of the secondary combustor; and a controllable ignition device to ignite the exhaust gases in the combustion chamber at predetermined times.

2. A compounded engine as defined in claim 1, further comprising:
a power turbine in fluid communication with, and driven by, exhaust gases resulting from combustion of the engine's exhaust in the combustion chamber.

3. A compounded engine as defined in claim 2, further comprising:
a heat exchanger in thermal communication with a heating liquid, the heat exchanger being in further thermal communication with, and using the heat from, at least one of the engine or the power turbine to heat the heating liquid.

4. A compounded engine as defined in claim 2, further comprising:
a plurality of heat exchangers in thermal communication with a common heating liquid, the heat exchangers being in further thermal communication with, and using the heat from, at least one of a system cooling the engine, a system lubricating the engine, or exhaust gases exiting the power turbine, to heat the heating fluid.

5. A compounded engine as defined in claim 4, wherein an engine drive shaft is in driving communication with a drive shaft on the power turbine.

6. A compounded engine as defined in claim 2, further comprising:
a second Wankel engine having a housing with a trochoidal inner surface containing a generally triangular shaped rotor, the engine containing a fuel supply system suitable for operating the engine with natural gas as a fuel;
a second turbocharger compressing air for combustion by the second engine, the second turbocharger being driven by the exhaust gases which exit from the second engine;
a combustion chamber in fluid communication with the exhaust from the second engine after that exhaust has passed through the turbocharger, with that chamber having an ignition device suitable for igniting hydrocarbons in the second engine's exhaust, whereby the second engine's timing, and the air and fuel mixture of the second engine are controlled so that when the engine exhaust reaches the combustion chamber the exhaust contains a sufficient amount of oxygen and hydrocarbons to enable ignition and combustion of the second engine's exhaust in the combustion chamber without the addition of fuel or air, and whereby the engine operating conditions are controlled to vary the performance of the secondary combustor; and
a controllable ignition device to ignite the second engine's exhaust gases in the combustion chamber at predetermined times;
a second power turbine in fluid communication with, and driven by, exhaust gases resulting from combustion of the second engine's exhaust; and
a heat exchanger in thermal communication with a heating liquid, the heat exchanger being in further thermal communication with, and using the heat from, at least one of the second engine or the second power turbine to heat the heating liquid.

7. A compounded engine as defined in claim 6, wherein there are a plurality of heat exchangers in thermal communication with a common heating liquid, and wherein said plurality of heat exchangers use the heat from at least one of a system cooling the second engine, a system lubricating the second engine, or exhaust gases exiting the second power turbine, to heat the heating fluid.

8. A method of energy generation, comprising the steps of:
operating a Wankel engine having a housing with a trochoidal inner surface containing a generally triangular shaped rotor, the engine containing a fuel supply system suitable for operating the engine with natural gas, and using the energy generated by a drive shaft of the engine;
placing a turbocharger in fluid communication with the exhaust gases from the engine to compress air for use by the engine, the turbocharger being driven by the exhaust gases which exit from the engine;
communicating the engine's exhaust from the turbocharger to a combustion chamber; and
controllably igniting the hydrocarbons in the engine exhaust at predetermined times in the combustion chamber, whereby the engine timing, and the air and fuel mixture of the engine, are controlled to produce a sufficient amount of hydrocarbons and oxygen in the engine exhaust to enable ignition and combustion of the engine exhaust in the combustion chamber without the addition of fuel or air, and whereby the engine operating conditions are controlled to vary the performance of the secondary combustor.

9. A method as defined in claim 8, further comprising the step of:
communicating the exhaust from the combustion chamber to a power turbine, the exhaust driving the turbine to generate usable energy.

10. A method as defined in claim 8, further comprising the step of:
placing a heat exchanger in fluid communication with, and extracting heat from, at least one of the engine or the power turbine, the heat exchanger being further placed in thermal communication with a heating liquid to heat the liquid.

11. A method as defined in claim 9, further comprising the step of:
placing a heat exchanger in fluid communication with, and extracting heat from, at least one of the engine or the power turbine, the heat exchanger being further placed in thermal communication with a heating liquid to heat the liquid.

12. A method as defined in claim 9, further comprising the steps of:
placing a plurality of heat exchangers in thermal communication with a common heating liquid, and further placing the heat exchangers in thermal communication with at least one of a system cooling the engine, a system lubricating the engine, or exhaust gases exiting the power turbine to heat the heating liquid.

13. A method as defined in claim 11 wherein the heating liquid is water.

14. A method as defined in claim 9, comprising the further steps of:
operating a second Wankel engine having a housing with a trochoidal inner surface containing a generally triangular shaped rotor, the engine containing a fuel supply system suitable for operating the engine with natural gas, and using the energy generated by a drive shaft of the second engine;

placing a turbocharger in fluid communication with the exhaust gases from the second engine to compress air for use by the second engine, the turbocharger being driven by the exhaust gases which exit from the second engine;

communicating the exhaust from the turbocharger to a combustion chamber;

controllably igniting the hydrocarbons in the second engine's exhaust in the combustion chamber at predetermined times, whereby the second engine's timing, and the air and fuel mixture of the second engine, are controlled to produce a sufficient amount of hydrocarbons and oxygen in the second engine's exhaust to enable ignition and combustion of the second engine's exhaust without the addition of fuel or air, and whereby the engine operating conditions are controlled to vary the performance of the secondary combustor; and communicating the second engine's exhaust from the combustion chamber to a second power turbine, the exhaust driving the second turbine to generate usable energy; and placing a turbocharger in fluid communication with the exhaust gases from the second engine to compress air for use by the second engine.

15. A method as defined in claim 14, comprising the further steps of:

heating a heating liquid by placing a heat exchanger in thermal communication with the heating liquid, the heat exchanger being in further thermal communication with, and using the heat from, at least one of the second engine or the second power turbine to heat the heating liquid.

16. A method as defined in claim 15, wherein the heating liquid is heated by placing a plurality of heat exchangers in thermal communication with the common heating liquid, and wherein said plurality of heat exchangers use the heat from at least one of a system cooling the second engine, a system lubricating the second engine, or exhaust gases exiting the second power turbine, to heat the heating fluid.

* * * * *